May 24, 1927.

W. R. SPAULDING 1,630,142

DETACHABLE TRUNK FOR AUTOMOBILES

Filed Oct. 4, 1926    2 Sheets-Sheet 1

Inventor

William R. Spaulding,

By Shepherd Caufhll

Attorneys

May 24, 1927.  
W. R. SPAULDING  
1,630,142  
DETACHABLE TRUNK FOR AUTOMOBILES  
Filed Oct. 4, 1926    2 Sheets-Sheet 2

Inventor  
William R. Spaulding,  
By Shepherd & Campbell  
Attorneys

Patented May 24, 1927.

1,630,142

UNITED STATES PATENT OFFICE.

WILLIAM RUSSELL SPAULDING, OF INDEPENDENCE, KANSAS.

DETACHABLE TRUNK FOR AUTOMOBILES.

Application filed October 4, 1926. Serial No. 139,401.

This invention relates to a detachable trunk for automobiles and it has for its object to provide a trunk like container having means mounted thereon for easily and quickly attaching the said container to the spare tire carrier ring or to the rim of a spare tire of an automobile. It is quite common to mount trunks and like containers upon the rear of automobiles. However, many automobiles are not equipped to receive trunks as a part of their regular equipment, and, as a matter of fact, it is neither necessary nor desirable to carry these trunks about, in ordinary, about town, driving. However, when touring, or when on picnic trips, these trunks become desirable and it is the purpose of the present invention to provide means whereby they may be readily attached when required.

In the accompanying drawing—

Like numerals designate corresponding parts in all of the figures of the drawing.

Figure 1:
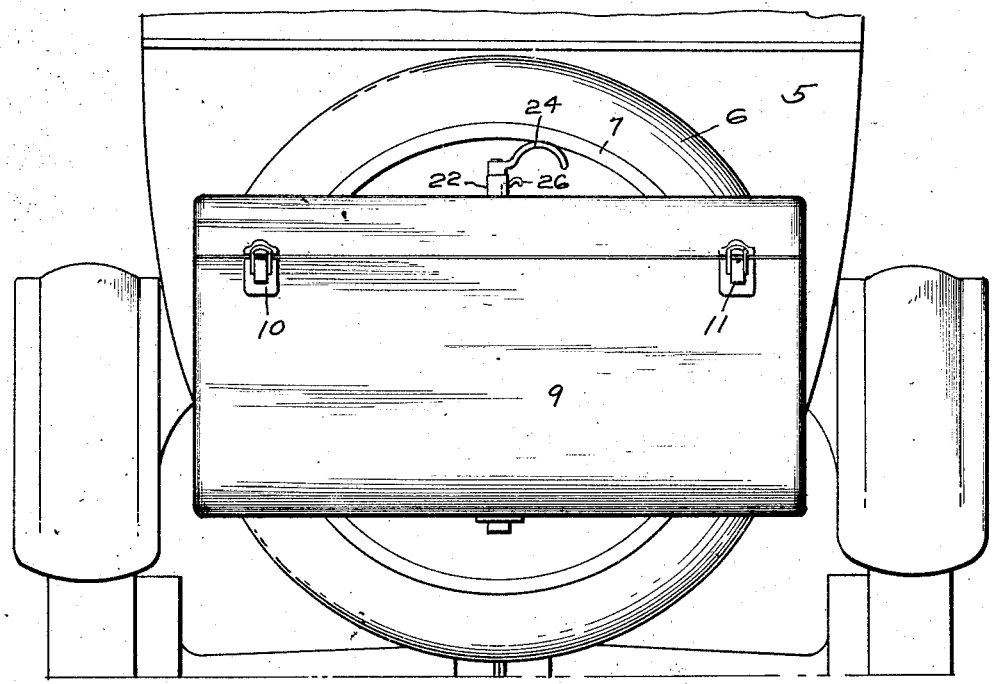
Fig. 1 is a rear view of an automobile having the device of the present invention applied thereto.
Figure 2:
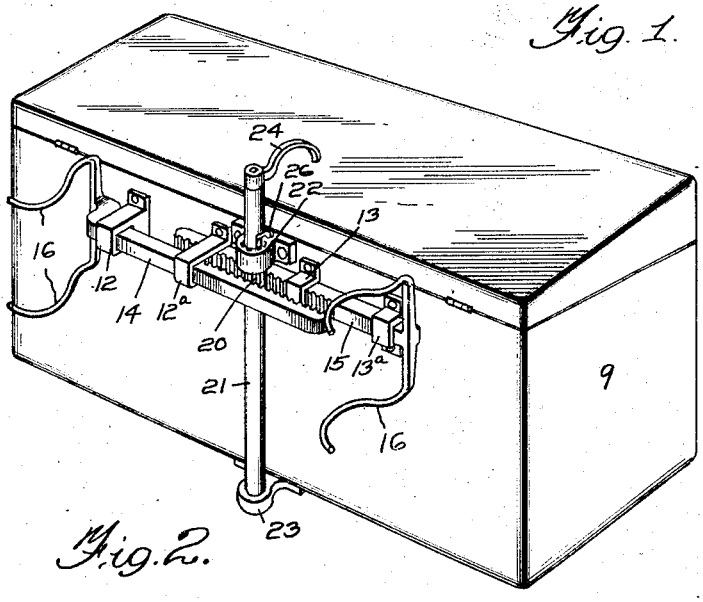
Fig. 2 is a perspective view of the trunk of the present invention with its supporting elements in retracted position.
Figure 3:
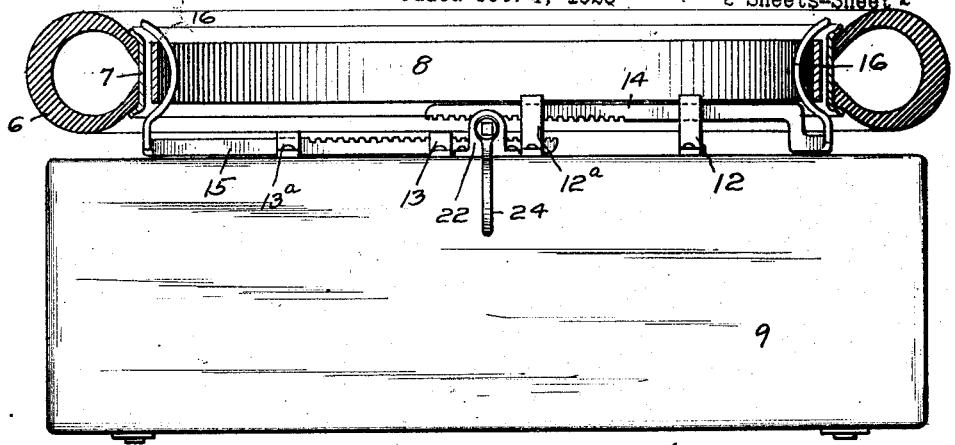
Fig. 3 is a plan view of the trunk with the supporting elements projected and with the spare tire and associated parts in section.

Referring to the drawing, 5 designates the body of an automobile, 6 the spare tire thereof, 7 the spare tire rim and 8, the spare tire carrier ring over which the rim 7 fits, and upon which the spare tire is supported. The trunk 9, having the usual fastening devices 10 and 11, will, preferably, be made of very light weight material. Upon its rear side, this trunk carries bearing brackets 12, 12$^a$ and 13, 13$^a$, in which rack bars 14 and 15 are mounted for slidable movement. In the form of the invention illustrated in Figs. 1, 2 and 3, each rack bears a pair of curved fingers 16, which, when the rack bars are projected or moved outwardly with respect to each other, engage over the inner face of the spare tire rim 7 or the spare tire carrier ring 8, as the case may be. That is, when the spare tire carrier comprises a complete circular ring 8, which lies in the path of movement of the said hooks, then the hooks engage that ring, but there are some types of spare tire carriers on the market which consist merely of a plurality of radial arms. In that case, the tire rim 7, itself, would be opposed to the hooks and would be engaged by said hooks. However, the principle of operation would be the same in both cases. The teeth of the bars 14 and 15 mesh with the teeth 20 of a vertical shaft 21, said shaft being journaled in bearings 22 and 23 and being provided with a handle 24 by which it may be turned. It is clear that if the vertical shaft is turned in one direction, the bars 14 and 15 will be moved inwardly, while if the shaft be turned in the other direction, the said bars will be moved outwardly or to projected position and when in the latter position, the fingers 16 and 16$^a$ will act to engage the spare tire carrier ring, or the spare tire rim in so forcible a manner as to very firmly mount this trunk in place. It is contemplated that the fingers 16 and 16$^a$ may be, if desired, of resilient material so their engagement will be of some elasticity whereby all tendency of the parts to rattle or squeak under the movement of the vehicle, will be eliminated.

Figure 4:
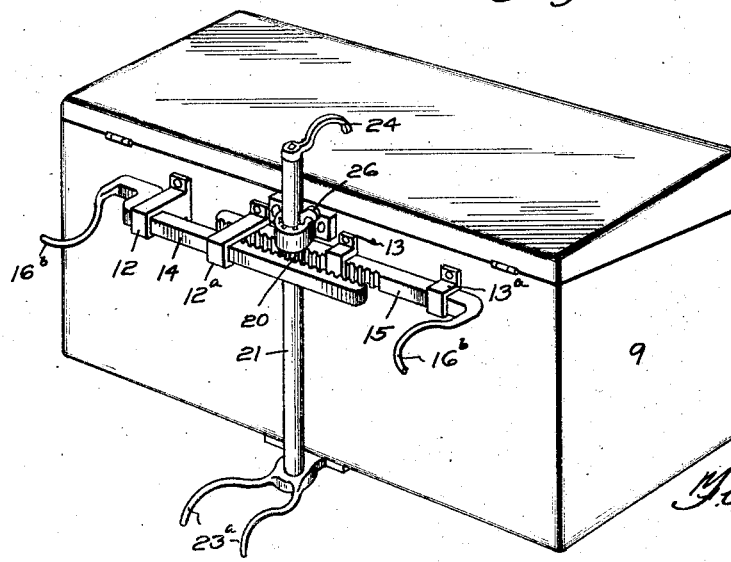
Fig. 4 is a perspective view showing a modified form of the invention.

In the form of the invention illustrated in Fig. 4, the lower bearing bracket 23 of the shaft 21, is illustrated as being provided with fingers 23$^a$ adapted to extend inwardly and engage over the spare tire carrier ring or the spare tire rim to support part of the weight of the trunk. In this case, the rack bars 14 and 15 are provided with single hooks 16$^b$, in lieu of the double hooks previously described, though it is, of course, manifest that double hooks may be used in this relation, if desired.

Figure 5:
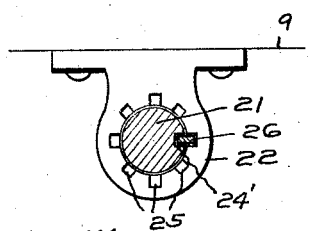
Fig. 5 is a horizontal sectional view through the operating shaft of the trunk, illustrating a locking means hereinafter described.

In Fig. 5, a locking means for the vertical shaft is illustrated which serves to hold the rack bars in their projected positions. This locking means comprises a keyway 24, formed in the vertical shaft 21, a plurality of complemental openings 25, formed in the upper bearing bracket 22 and a removable pin 26, constituting a key cooperating with openings 24 and 25 to lock the shaft against movement with respect to the bracket after the rack bars have been projected to their maximum locking position.

Figure 6:
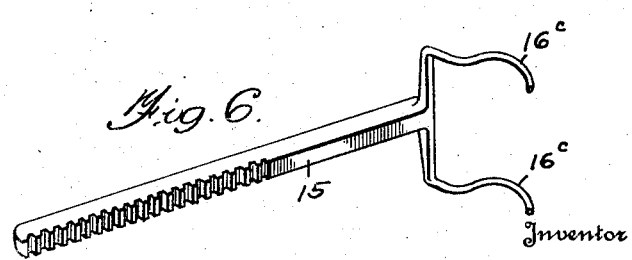
Fig. 6 is a further modified view.

Fig. 6 illustrates a modified form of rack or toothed bar in which the fingers 16ᶜ are curved inwardly instead of outwardly as in the other figures. By modifying the shape of the hooks as suggested in Fig. 6 and making the rack bars of sufficient length, the structure could be made to grip the outer face of the spare tire itself instead of the spare tire rim or carrier. It is manifest that in this case the gripping action would be effected by inward movement of the rack bars.

It is to be understood that the invention is not limited to the precise construction set forth but that it includes within its purview whatever changes fairly come within either the terms or the spirit of the appended claims.

Having described the invention what is claimed is:

1. The combination with a trunk or like container, of complemental gripping means movable back and forth across the rear face thereof and having parts projecting perpendicularly to the back of the trunk adapted to engage the spare tire structure of an automobile at substantially opposed diametric points of the latter.

2. The combination with a trunk or like structure, of gripping means movable inwardly and outwardly at the rear face thereof and having parts projecting perpendicularly to the back of the trunk, adapted when projected outwardly to engage the inner face of the spare tire structure of an automobile at substantially opposed diametric points of the latter.

3. The combination with a trunk or like container, of a pair of rack bars mounted upon the rear face thereof, a vertical shaft carrying a pinion engageable with said rack bars for projecting and retracting them and means carried by the outer ends of said rack bars projecting perpendicularly to the back of the trunk to extend within and engage over the inner face of the spare tire structure of an automobile at substantially opposed diametric points of the latter.

4. A structure as recited in claim 3 in combination with locking means to prevent reverse movement of the rack bars.

5. A structure as recited in claim 3 in combination with a locking means for the vertical shaft.

6. A structure as recited in claim 3 in combination with a removable locking pin for holding the vertical shaft against reverse movement.

7. In combination with a trunk or like container of pair of rack bars mounted for movement longitudinally across the rear face thereof, toward and from the ends of said trunk, each of said rack bars having a pair of vertically spaced curved fingers at its outer ends, which project perpendicularly to the back of the trunk and are adapted to project within and engage over the inner face of the spare tire structure of an automobile at substantially opposed diametric points of the latter, a pinion engaging said rack bars and means for operating said pinion.

8. The combination with a trunk or like container having a length in excess of the diameter of a tire carrier, of a pair of elements mounted upon the rear face thereof, members movable toward and from the ends of said trunk, carried by the first named members and shaped to project within and engage over the faces of the spare tire structure of an automobile at substantially opposed diametric points of the latter, means for moving said first named members toward and from each other and a supporting member at the bottom of the trunk, adapted to engage over the lower central portion of the spare tire structure of the automobile.

9. The combination of a trunk or like container, a pair of rack bars upon the rear face thereof, fingers at the outer ends of said rack bars shaped to engage the spare tire structure of an automobile, a vertical shaft carrying a pinion engageable with said rack bars, an operating handle upon the upper end of said vertical shaft, bearing brackets for the upper and lower portions of said shaft and hooked supporting fingers projected from the lower bearing bracket and adapted to engage over the lower central portion of the spare tire structure of the automobile.

In testimony whereof I affix my signature.

WILLIAM RUSSELL SPAULDING.